(12) United States Patent
Norton et al.

(10) Patent No.: US 11,470,066 B2
(45) Date of Patent: Oct. 11, 2022

(54) VIEWING OR SENDING OF IMAGE OR OTHER DATA WHILE CONNECTED TO SERVICE ASSOCIATED WITH PREDETERMINED DOMAIN NAME

(71) Applicant: Lenovo (Singapore) Pte. Ltd., Singapore (SG)

(72) Inventors: Robert Norton, Raleigh, NC (US); Justin Michael Ringuette, Morrisville, NC (US); Sandy Scott Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 178 days.

(21) Appl. No.: 16/795,196

(22) Filed: Feb. 19, 2020

(65) Prior Publication Data
US 2021/0258292 A1    Aug. 19, 2021

(51) Int. Cl.
*G06F 16/907*    (2019.01)
*H04L 9/40*    (2022.01)
*G06F 16/954*    (2019.01)

(52) U.S. Cl.
CPC .......... *H04L 63/061* (2013.01); *G06F 16/907* (2019.01); *G06F 16/954* (2019.01)

(58) Field of Classification Search
CPC .................................................... G06F 16/954
See application file for complete search history.

(56) References Cited

U.S. PATENT DOCUMENTS

| | | | | |
|---|---|---|---|---|
| 2004/0103364 A1* | 5/2004 | Dornback | ............... | G06F 9/451 715/201 |
| 2014/0022586 A1* | 1/2014 | Zehler | .................... | G06K 15/00 358/1.14 |
| 2014/0366159 A1* | 12/2014 | Cohen | ..................... | G06F 21/10 726/28 |
| 2015/0067893 A1* | 3/2015 | Lee | ........................... | G06F 21/10 726/30 |
| 2015/0143119 A1* | 5/2015 | Matsunaga | .......... | H04N 21/835 713/168 |
| 2015/0286791 A1* | 10/2015 | Altobello | ............... | G16H 30/20 705/3 |
| 2017/0185789 A1* | 6/2017 | Khosravi | ............ | G06F 21/6209 |
| 2018/0039611 A1* | 2/2018 | Trivedi | .................. | G06Q 20/12 |
| 2018/0288018 A1* | 10/2018 | Cooke | ..................... | G06F 21/42 |

OTHER PUBLICATIONS

"Transient-key Cryptography", Wikipedia, retrieved on Feb. 6, 2020 from https://en.wikipedia.org/wiki/Transient-key_cryptography.

* cited by examiner

*Primary Examiner* — Di Xiao
(74) *Attorney, Agent, or Firm* — John M. Rogitz; John L. Rogitz (57) ABSTRACT

In one aspect, a first device may include at least one processor and storage accessible to the at least one processor. The storage may include instructions executable by the at least one processor to determine that the first device is currently logged in to a service associated with a predetermined domain name. The instructions may also be executable to, based on the first device being logged in to the service associated with the predetermined domain name, permit an image to be one or more of viewed at the first device and sent to a second device. The image may not be accessed by the first device through the service or sent to the second device through the service.

12 Claims, 6 Drawing Sheets

VIEWING OR SENDING OF IMAGE OR OTHER DATA WHILE CONNECTED TO SERVICE ASSOCIATED WITH PREDETERMINED DOMAIN NAME

FIELD

The present application relates to technically inventive, non-routine solutions that are necessarily rooted in computer technology and that produce concrete technical improvements.

BACKGROUND

As recognized herein, digital photographs can be very useful in quickly and clearly assessing a problem with remotely-located equipment. However, in secure or classified locations, photography is often not allowed due to the security risk of leaks and hacking. Some secure and classified locations even prohibit the mere presence or possession of any device with a camera, or at the very least require that the device be turned off.

The foregoing helps to maintain security, but as recognized herein, these security measures inhibit the fast, free-flow sharing of digital photographs over the Internet to help a remotely-located person expedite assessment and repair of factory equipment that might be failing. There are currently no adequate solutions to the foregoing computer-related, technological problem.

SUMMARY

Accordingly, in one aspect a first device includes at least one processor and storage accessible to the at least one processor. The storage includes instructions executable by the at least one processor to determine that the first device is currently logged in to a service associated with a predetermined domain name. The instructions are also executable to, based on the first device being logged in to the service associated with the predetermined domain name, permit an image to be one or more of viewed at the first device and sent to a second device. The image is not accessed by the first device through the service, or sent to the second device through the service.

Thus, in some implementations the instructions may be executable to permit the image to be viewed at the first device based on the first device being logged in to the service associated with the predetermined domain name, where the image may not be accessed by the first device through the service. In some examples, the service may be a first service and the instructions may be executable to access the image through one or more of an email service that is different from the first service and a text message service that is different from the first service.

Also in some examples, the instructions may be executable to determine that metadata for the image indicates that the first device is to be logged in to the service for image viewing. In these examples, the instructions may then be executable to use the service to acquire a decryption key to decrypt the image for viewing at the first device based on the determination that the metadata for the image indicates that the first device is to be logged in to the service for image viewing. The decryption key may be an expiring decryption key that is useable for a threshold amount of time to decrypt the image, where after the threshold amount of time the decryption key may no longer be valid to decrypt the image.

Additionally, in some implementations the service may be accessed using a first network that is different from a second network through which the image is one or more of viewed at the first device and sent to a second device.

Also in some implementations, the instructions may be executable to permit the image to be sent to the second device based on the first device being logged in to the service associated with the predetermined domain name, where the image may not be sent to the second device through the service. In some examples, the service may be a first service and the image may be sent to the second device through a second service different from the first service. So, for example, the second service may be established by one or more of an email service, a text message service, and/or a cloud storage service.

Additionally, in some examples the instructions may be executable to use the first service to access an encryption key, use the encryption key to encrypt the image for decryption using an expiring decryption key, and send the encrypted image to the second device.

Also in some examples, the instructions may be executable to permit the image to be one or more of viewed at the first device and sent to the second device through a first application executing at the first device, where the first device may be logged in to the service through a second application different from the first application. For example, the second application may be a web browser application. Or, as another example, both the first and second applications may be mobile applications, neither of which may be web browser application.

In another aspect, a method includes determining that a first device is actively connected to a service associated with a predetermined domain name and, based on the first device being actively connected to the service associated with the predetermined domain name, permitting an image to be one or more of viewed at the first device and sent to a second device. The image is not accessed for viewing through the service or sent to the second device through the service.

Thus, in some implementations the method may include using the first device to generate the image with a camera on the first device while the first device is at a predetermined location and, responsive to the image being generated with the camera while the first device is at the predetermined location, encrypting the image with an encryption key that is associated with the predetermined location. The image may be encrypted with the encryption key for decryption using an expiring decryption key, where the encryption key may be accessed by the first device through the service while the first device is actively connected to the service. In these implementations, the method may then include permitting the image to be sent to the second device while the first device is actively connected to the service, where the image may not be sent to the second device through the service.

Also in some implementations, the method may include permitting the image to be viewed at the first device based on the first device being actively connected to the service associated with the predetermined domain name. So, for example, the method may include receiving an expiring decryption key through the service, decrypting the image using the expiring decryption key, and presenting the decrypted image on a display of the first device for viewing.

In another aspect, at least one computer readable storage medium (CRSM) that is not a transitory signal includes instructions executable by at least one processor to determine that a first device is currently logged in to a service through a first network and, based on the first device being logged in to the service through the first network, permit data to be one or more of presented at the first device as received through a second network and sent to a second device through the second network. The first network is different from the second network.

In some examples, the first network may be associated with a predetermined domain name, and the data may include one or more of a still photograph, an audio file, and/or a video file.

Additionally, in some examples the instructions may be executable to determine that the first device is currently logged in to the service using biometric identification and, based on the first device being logged in to the service using biometric identification, permit the data to be one or more of presented at the first device as received through the second network and sent to the second device through the second network. But based on the first device being logged in to the service but not using biometric identification, the instructions may be executable to decline to permit the data to be one or more of presented at the first device as received through the second network and sent to the second device through the second network.

The details of present principles, both as to their structure and operation, can best be understood in reference to the accompanying drawings, in which like reference numerals refer to like parts, and in which:

DETAILED DESCRIPTION

Among other things, the present application discloses systems and methods for domain-locking photographs. The pictures themselves may be taken in certain sensitive areas and may be forcibly encrypted so that they can only be viewed or sent from a device that is actively connected to a predetermined parent domain, whether the pictures are actually sent/viewed through that domain connection or instead are sent/viewed through another service or network. This may help ensure that any device sending or viewing the file was inside of the company's firewall and connected with updated/current credentials.

So, for example, suppose a fulfillment center for a device manufacturer has a very strict no-cameras policy in their manufacturing area. Because, as recognized herein, it is often quite difficult to show progress of changes to the manufacturing flow or to diagnose line-down situations remotely when no picture of the issue is available for viewing, the systems and methods disclosed herein permit users to freely pass pictures between devices that are actively logged in to manufacturer's domain with relative confidence that the pictures will not be inadvertently sent to a competitor or disinterested party.

As another example, suppose an employee at the United States Mint is able to easily facilitate his/her hourly reporting process by taking pictures of the monitoring system readout and transmitting status updates at the touch of a button after optical character recognition software has been ran on the pictures to derive the status updates themselves. The security imposed on the sending and/or receiving devices knows that the image cannot be transmitted or viewed when the respective device is not connected to the U.S. Mint Domain. This may remain true, even if the photo was deleted and later restored for viewing again.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
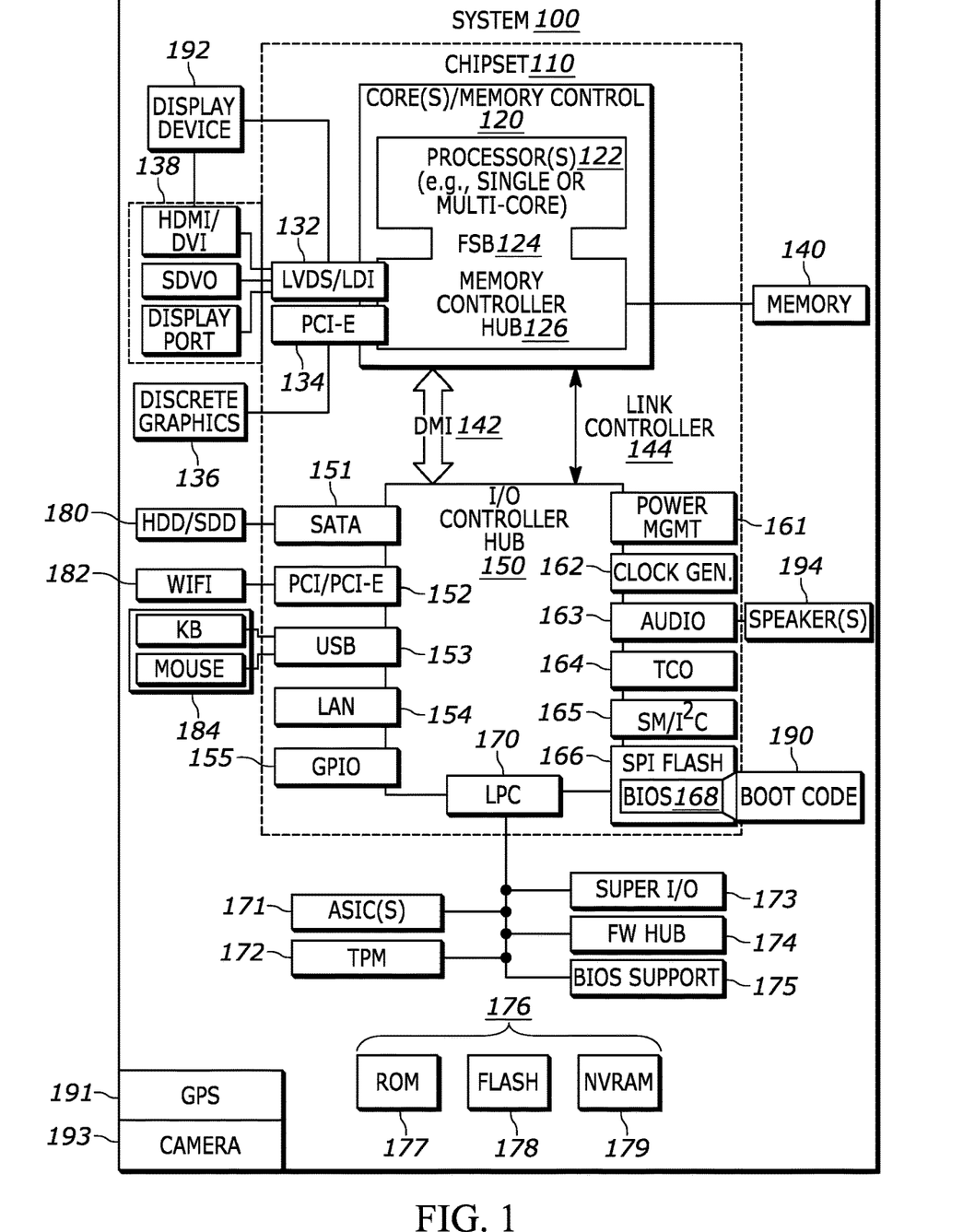
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Also, the system 100 may include a global positioning system (GPS) transceiver 191 that is configured to communicate with at least one satellite to receive/identify geographic position information and provide the geographic position information to the processor 122 consistent with present principles. However, it is to be understood that another suitable position receiver other than a GPS receiver may be used in accordance with present principles to determine the location of the system 100.

Still further, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone.

It is to be understood that an example client device or other machine/computer may include fewer or more features than shown on the system 100 of FIG. 1. In any case, it is to be understood at least based on the foregoing that the system 100 is configured to undertake present principles.

Figure 2:
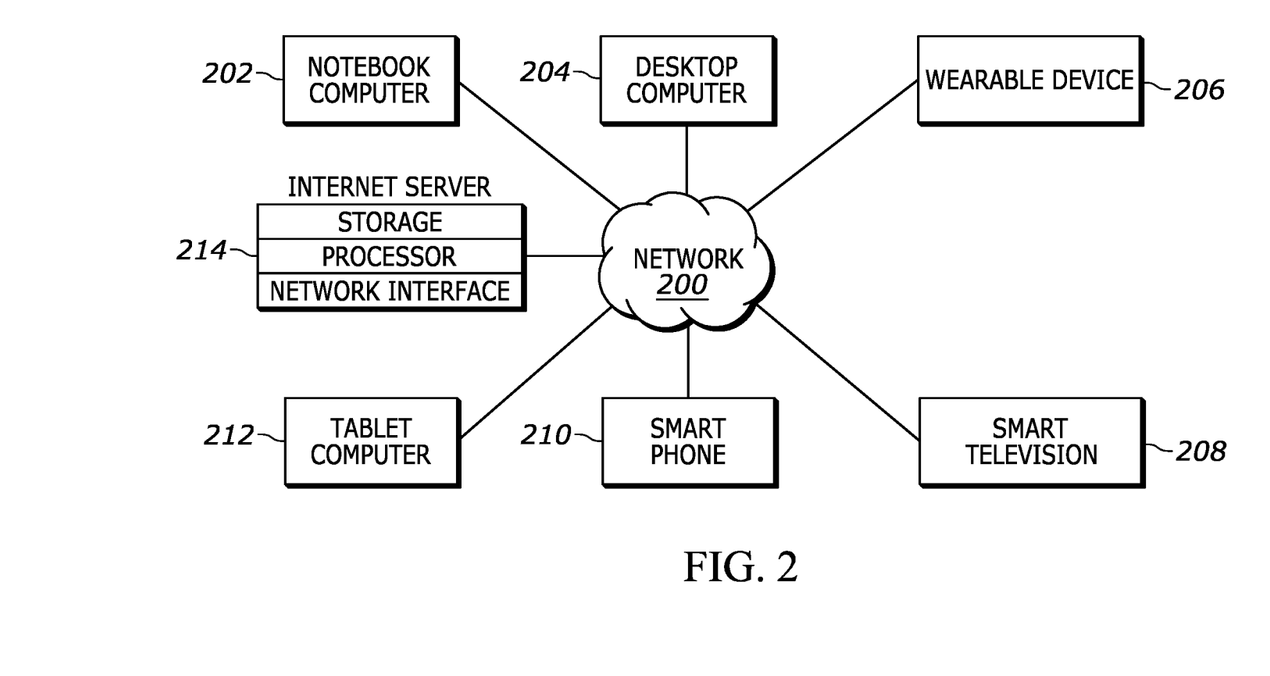
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
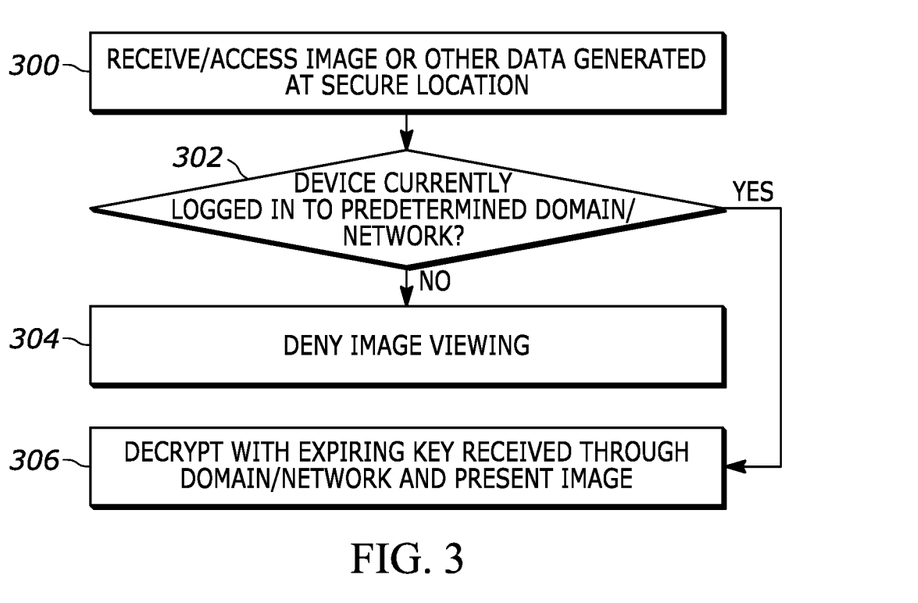
FIGS. 3 and 4 are flow charts of example algorithms for viewing or sending an image while a device is actively connected to a service associated with a predetermined domain name consistent with present principles.

Referring to FIG. 3, it shows example logic that may be executed by a first end-user device such as the system 100 in accordance with present principles. Beginning at block 300, the first device may receive or otherwise access an image (or other data). The image may have been generated at a secure location or originated from a secure location. For example, the image may have been generated using a camera on a second device while the second device is located at the secure location, and/or the image may have been sent/originated from the second device while the second device is at the secure location even if the image itself was generated at a different location using the second device's camera. The secure location itself may be predetermined, e.g., by a system administrator. The secure location may be identifiable via GPS coordinates, building layout data, etc. accessible to the second device.

The image or other data that is received at block 300 may be received via text message over a cellular network, via email using a Wi-Fi network, through a particular mobile application, etc., or even accessed via cloud storage or a remotely-located server to which the first device has access. In some examples, the image or other data might even be already stored at the first device itself.

From block 300 the logic may then proceed to decision diamond 302. At diamond 302 the first device may determine whether it is currently logged in to, or otherwise actively connected to, a service through a predetermined domain name and/or predetermined network. For example, the service may provide access to a virtual private network or private computer network established by an employer, where its employees may log in to the service to gain access to the private network. Access may be gained for example by navigating, using a web browser and Internet connection, to a website having the predetermined domain name in the website's uniform resource locator (URL) in order to log in to the employer's system to perform work-related tasks. The web browser through which login is accomplished may be a desktop version of a web browsing application executing at a laptop or desktop computer, and the login itself may be performed using a username and password and/or using biometric identification/authentication, for example. As another example, the first device may be actively connected to the service, even if not specifically logged in with username/password credentials, using a secure and/or encrypted connection provided via a transport layer security (TLS) protocol and/or secure sockets layer (SSL) protocol.

Note that the service or network to which the first device is logged in or otherwise actively connected to may not be the same service or network through which the image itself was received or accessed at block 300. For example, while the service may be a private online portal associated with the end-user's employer and accessed at a website with the predetermined domain name through a virtual private network (VPN), the image may have been received via short message service (SMS) over a wireless cellular network or received via email through an email service/account accessed over a Wi-Fi network or the open Internet.

Responsive to the first device making a negative determination at diamond 302, the logic may proceed to block 304 where the device may deny viewing or presentation of the image using the first device. This may be based on the negative determination itself, and/or the inability to decrypt the image as received or accessed owing to the first device not having access to the appropriate decryption key. However, responsive to an affirmative determination at diamond 302, the logic may instead proceed to block 306.

At block 306 the first device may retrieve or otherwise access a decryption key through the service to which the first device is logged in or otherwise actively connected. For example, at block 306 the first device may attempt to access the image and determine that metadata for the image indicates that the first device is to be logged in to the service to retrieve the decryption key that is usable to decrypt the image for viewing/presentation at the first device. Thus, the first device may communicate through or otherwise use the service to acquire the decryption key (e.g., from a secure server accessible through the service). Note that the decryption key may be an expiring decryption key that is useable for a threshold amount of time (e.g., one minute) to decrypt the image, where after the threshold amount of time the decryption key may no longer be valid/usable to decrypt the image. The expiring decryption key may have been generated using a suitable transient-key cryptography algorithm, for example.

However, note that in other embodiments the decryption key may not be an expiring decryption key but may still be domain-locked to the domain name for the service itself so that, e.g., the key may only be used while the first device is connected to the service through the website having the domain name. So for example, the service may provide the decryption key to the first device with a restriction that the key cannot be stored at the first device in RAM and/or persistent storage such as a hard disk drive.

In any case, once retrieved or otherwise accessed, the decryption key may be used to decrypt the image at block 306. The image may then be presented on a display on or otherwise accessible to the first device, also at block 306.

Figure 4:
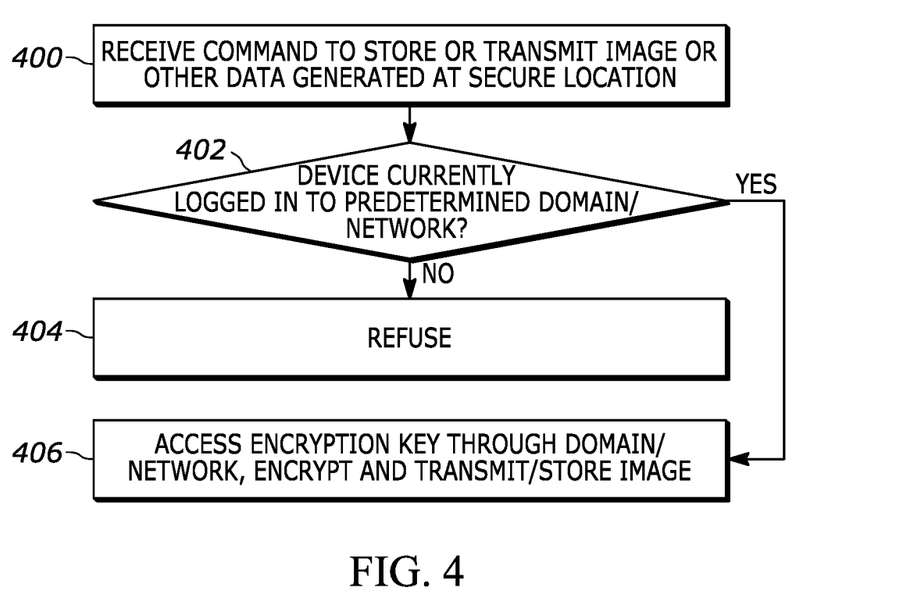

Continuing the detailed description in reference to FIG. 4, it also shows example logic that may be executed by a first end-user device such as the system 100 in accordance with present principles. But in this case, rather than attempting to present an image that was sent or originated from a secure location, the first device is attempting to send the image as generated or originated at the secure location (e.g., while the first device is still at the secure location, or even at a different location other than the secure location at a later time after generating the image at the secure location).

Beginning at block 400, the first device may receive a command from an end-user of the first device to send or transmit an image or other data (e.g., an audio recording) that was generated by the first device while at the secure location as determined, e.g., from GPS coordinates for the first device. However, in some implementations the first device may receive a command to store the image to its local storage or to cloud storage in addition to or in lieu of sending the image. For example, the command may be a command to the first device's camera to generate the image in the first place which in turn may cause automatic storing of the image to the first device's local storage after being taken.

From block 400 the logic may then proceed to decision diamond 402. At diamond 402 the first device may determine whether it is currently logged in to, or otherwise actively connected to, a service through a predetermined domain name and/or network consistent with present principles including the description of FIG. 3 above.

Note that the service or network to which the first device is logged in or otherwise actively connected to may not be the same service or network through which the image itself is to be transmitted. For example, while the service may be private online portal associated with the end-user's employer and accessed at a website with a predetermined domain name through a virtual private network (VPN), the end-user may provide a command to the first device to send the image to a recipient via short message service (SMS) over a wireless cellular network or via email through an email service/account accessed over a Wi-Fi network or the open Internet.

Responsive to the first device making a negative determination at diamond 402, the logic may proceed to block 404 where the device may refuse or decline to store or send the image. This may be based on code in the kernel for the first device's operating system that disallows image storage and/or image transmission for images generated at predetermined secure locations if the first device is not connected to the service. The kernel may even disallow image transmission for images that are generated at predetermined secure locations even if the images are not sent until a later time when the first device is at a different location instead, such as a public location. Thus, the encryption key may be domain-locked in that it may only be used by the first device for encrypting data while the first device is logged in to the service, and otherwise for example data may not be generated or stored at all while the first device is at the predetermined location. The kernel itself may have been configured by a system administrator or provider of the first device, for example, and the kernel may even indicate a storage location within the service's network at which the encryption key may be accessed.

However, force encryption may also be used in addition to or in lieu of the foregoing so that the image may be encrypted automatically responsive to generation of the image at the predetermined location itself. Moreover, the encryption key used during force encryption may be an expiring encryption key of an asymmetrical key pair, with the pair also including a reciprocal expiring decryption key that may only be accessible via the service and useable to decrypt the image for a threshold amount of time while the decryption key has not yet expired.

Still in reference to diamond 402, note that responsive to an affirmative determination the logic may instead proceed to block 406. At block 406 the first device may retrieve or otherwise access the encryption key through the service (e.g., expiring encryption key that can only be used to encrypt an image for a threshold amount of time after which the key may become invalid and/or unusable for encryption). The encryption key may have been retrieved at block 406 through the service to which the first device is logged in or otherwise actively connected.

Also at block 406, responsive to the image being encrypted the first device may then be permitted to send to a second device (or store) the image itself as encrypted. For example, the first device may send a text message or email with the image to a recipient specified by the end-user, with the image being sent through a network separate from the one used to access the service to which the first device is logged in. As another example, the first device may upload the image to a cloud storage account accessible to the first device and/or other devices.

Figure 5:
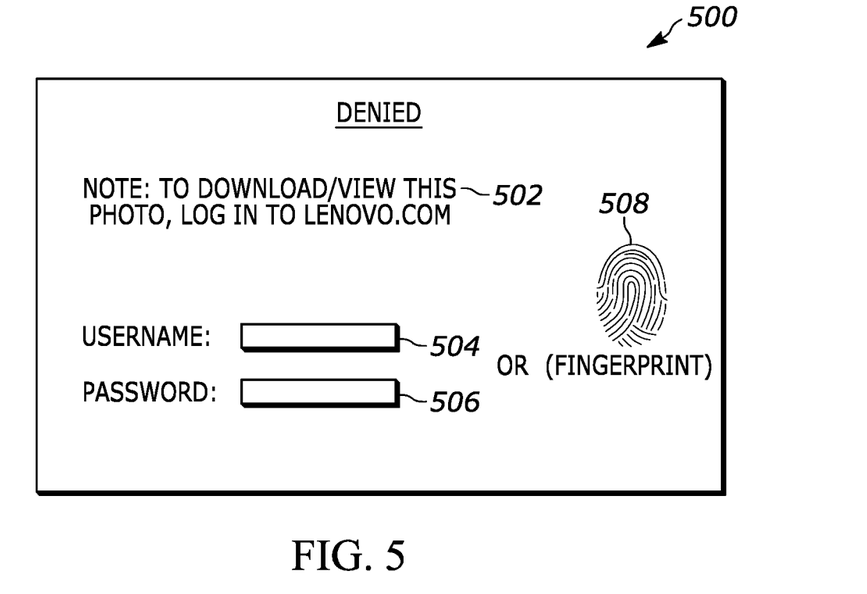
FIGS. 5-9 show various example graphical user interfaces (GUIs) that may be presented on a display to view or send an image while a device is actively connected to a service associated with a predetermined domain name consistent with present principles.

Now describing FIG. 5, it shows an example graphical user interface (GUI) 500 that may be presented on the display of a device configured to undertake present principles. The GUI 500 may be presented responsive to receipt of an image (or other data) at the device and a command to view the image. However, as indicated in FIG. 5, the device has declined to present the image on the display because the device is not currently connected to the Lenovo.com domain name, as indicated by text 502. But, as also shown the text 502 may also indicate that the user of the device may log in to his or her electronic account for the Lenovo.com domain by entering a preestablished username into input field 504 and a preestablished password into input field 506.

Additionally, note that in some examples in order to view (or send or store) an image or other data consistent with present principles (e.g., an image generated at a secure location), a user might be required to not just be logged in to an end-user account for a given service, but to specifically be logged in using a relatively more secure authentication method than username/password authentication. This might be true even if the user is otherwise able to access the contents and functions of the user's account using username/password authentication.

For example, biometric authentication might be required. The biometric authentication may be fingerprint authentication, voice identification, facial identification, etc. Another example of more-secure authentication that might be required is two-step authentication where username/password authentication is permitted but then a user is also asked to enter a code sent to the user via text message or email in order to access his or her account.

With this in mind, note that the GUI 500 may include a fingerprint entry area 508 that may be used in addition to or in lieu of username/password authentication to gain access to the user's account. The fingerprint area 508 may include a representation of a fingerprint as shown and under the area 508 may be an under-display fingerprint sensor, such as an optical fingerprint sensor or ultrasonic fingerprint sensor.

Figure 6:
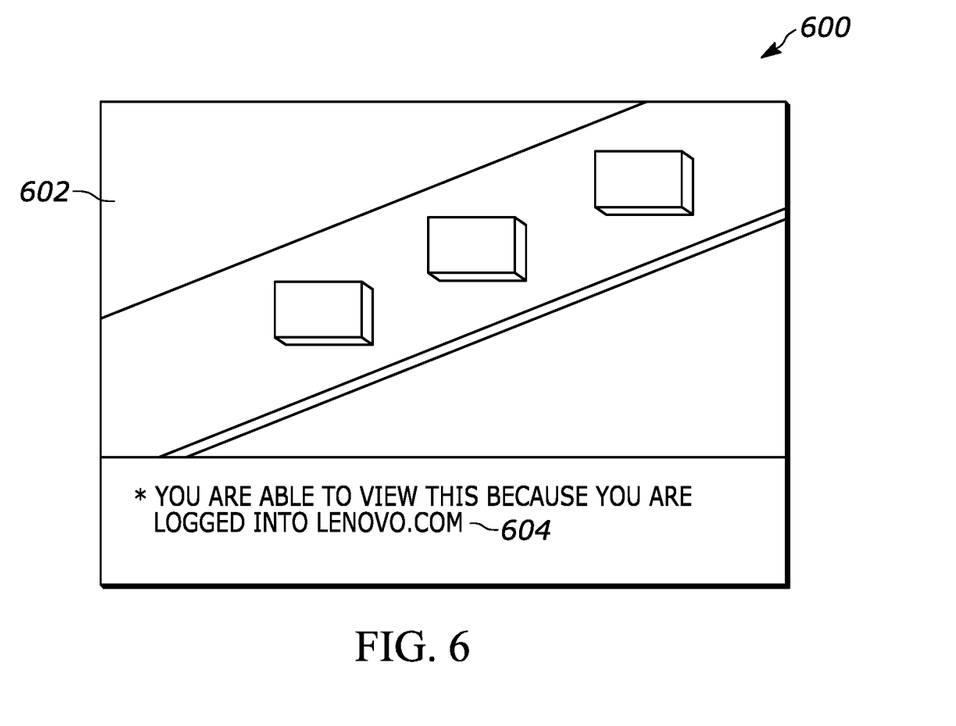

Now in reference to FIG. 6 but continuing the example above from FIG. 5, responsive to establishing active connection to the Lenovo.com domain based on user authentication, a GUI 600 may be presented on the display of the user's device. As shown, the GUI 600 may present an image 602 of boxes on a factory conveyor belt at a secure factory where proprietary manufacturing methods are used. As also shown in FIG. 6, the GUI 600 may include an overlay window 604 with an icon and text that indicates that the user is able to view the image 602 because the device is logged in to the user's account hosted on the Lenovo.com website domain.

Figure 7:
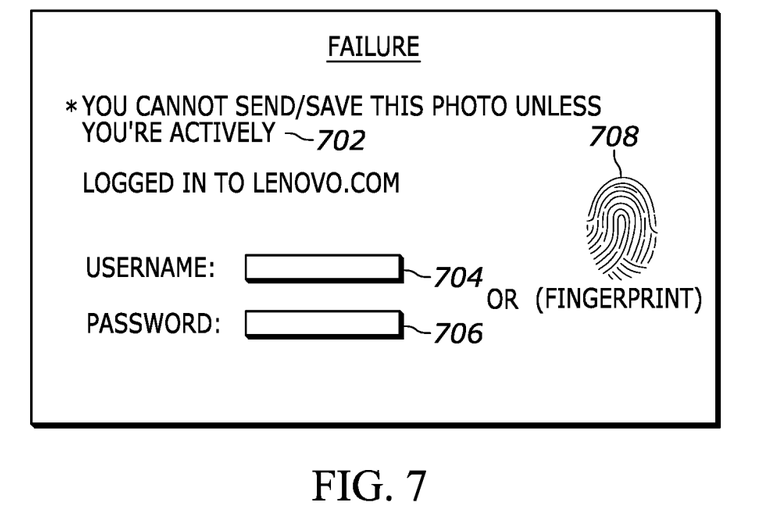

Continuing the detailed description in reference to FIG. 7, it shows another example GUI 700 that may be presented on the display of a device configured to undertake present principles. The GUI 700 may be presented responsive to a command to the device by a user to generate an image (or other data) using the device's camera, store the image, and/or transmit the image to another device.

However, as indicated in FIG. 7, the device has declined to generate, store, and/or transmit the image because the device is not currently connected to the Lenovo.com domain name, as indicated by text 702. But, as also shown the text 702 may also indicate that the user of the device may log in to his or her electronic account for the Lenovo.com domain by entering a preestablished username into input field 704 and a preestablished password into input field 706.

Additionally, note that in some examples in order to generate, store, and/or send an image or other data consistent with present principles (e.g., an image generated at a secure location), a user might be required to not just be logged in to an end-user account for a given service, but to specifically be logged in using a relatively more secure authentication method than username/password authentication, such as biometric authentication or two-step authentication as described herein. This might be true even if the user is otherwise able to access the contents and functions of the user's account using username/password authentication.

Thus, in examples where biometric authentication may be required to store or send an image taken while the device was located at a secure area, the GUI 700 may include a fingerprint entry area 708 that may be used in addition to or in lieu of username/password authentication to gain access to the user's account. The fingerprint area 708 may include a representation of a fingerprint as shown and under the area 708 may be an under-display fingerprint sensor, such as an optical fingerprint sensor or ultrasonic fingerprint sensor.

Figure 8:
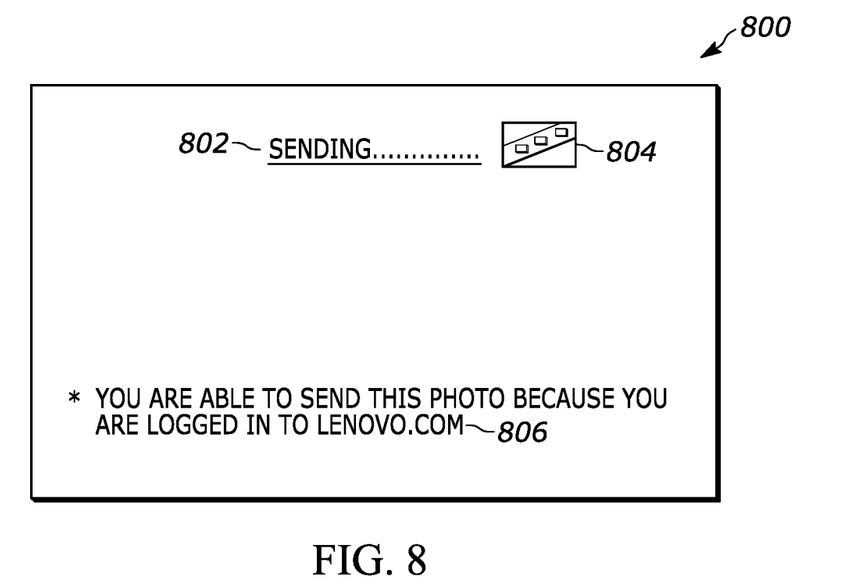

Now in reference to FIG. 8 but continuing the example above from FIG. 7, responsive to establishing active connection to the Lenovo.com domain based on user authentication, a GUI 800 may be presented on the display of the user's device. As shown, the GUI 800 may present an indication 802 that the image is being sent (or stored). Thus, the indication 802 may include text indicating that the image is being sent (or stored) and may also include a thumbnail version 804 of the image itself that is being transmitted (or stored).

As also shown in FIG. 8, the GUI 800 may include an indication 806 with an icon and text that indicates that the user is able to send the image because the device is logged in to the user's account hosted on the Lenovo.com website domain.

Figure 9:
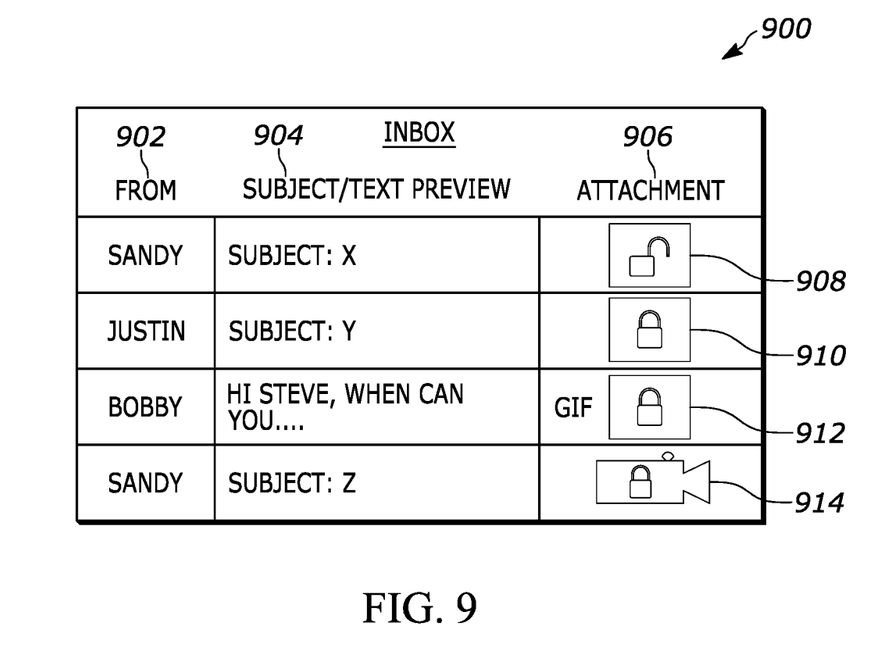

Continuing now in reference to FIG. 9, it shows an example GUI 900 that may be presented on the display of an end-user's device. As shown, the GUI 900 may be the inbox of an email account or text message application of the user. The GUI 900 may include sections 902, 904, and 906 respectively indicating data for various messages in the inbox, including the sender of the message (section 902), the subject line or a preview of the text of the message itself (section 904), and an indication of any attachments to the respective message (section 906).

Consistent with present principles, the section 906 for the attachments may use various icons to indicate whether the attachment is only able to be viewed, saved, or forwarded/sent to others while the device is connected to a predetermined domain. For example, the icon 908 may include a graphic of an unlocked padlock to indicate that the user's device is not required to be actively connected to a certain domain name in order for the attachment for that respective message to be viewed, stored, and/or forwarded to others.

However, as also shown, an icon 910 with a graphic of a locked padlock may be presented for another message to indicate that an active connection to a predetermined domain name is required to view, store, and/or forward the associated attachment. In examples where the attachment is a gif image but cannot be viewed unless the device is actively connected to the predetermined domain name, an icon 912 may be presented that has graphics that indicates both that the attachment is a gif (via text) and that an active connection is required for interaction with the attachment (via the graphic of a locked padlock).

In another example where the attachment is a video rather than still image but still cannot be viewed unless the device is actively connected to a predetermined domain name, an icon 914 may be presented with graphics that indicate both that the attachment is a video (via the graphic of a video camera) and that an active connection is required for interaction with the attachment (via the graphic of the locked padlock within the graphic of the video camera).

Figure 10:
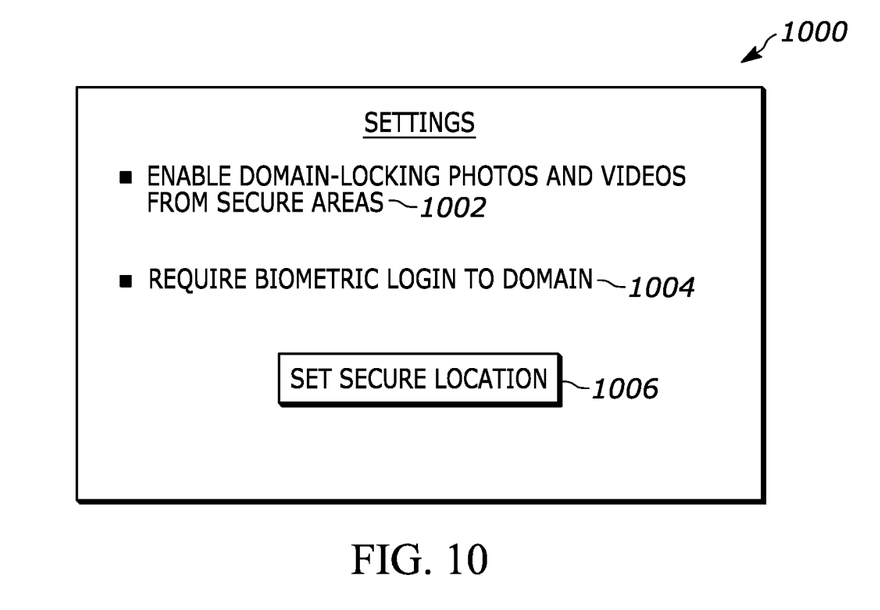
FIG. 10 is an example settings GUI for configuring one or more settings of a device, or the service itself, for image sending and viewing consistent with present principles.

Before moving on to the description of FIG. 10, note that icons similar to the icons 908-914 may be presented over top of the preview for the attachment itself that may be presented as part of the associated message itself when the message is presented responsive to selection of the message from the inbox 900. The device, and/or respective icon itself as presented in the message, may even disallow download or the actual previewing of the attachment unless the active connection with the predetermined domain name is established and/or occurring.

Now describing FIG. 10, it shows an example GUI 1000 that may be presented on the display of an end-user's device (or the display of a system administrator's device) in order to set or configure one of more settings of the device (or online service itself) to operate consistent with present principles. As shown in FIG. 10, the GUI 1000 may include a first option that may be selectable by directing touch or cursor input to the adjacent check box in order to configure the device (and/or online service itself) associated with a given domain name to require that service login be established and currently ongoing in order to send, store, or view images or other data generated at a location that has been designated as secure.

The GUI 1000 may also include an option 1002 that may also be selectable via its respective check box in order to require biometric authentication for the active connection to the service in order to send, store, or view images or other data generated at a secure location (e.g., rather than mere username/password authentication).

Still further, a selector 1006 may be presented on the GUI 1000. The selector 1006 may be selectable to initiate a process where the GUI 1000 is removed and another GUI is presented at which the end-user (or system administrator) may designate a particular location as being secure so that images and other data generated at that location can only be viewed while an active connection to a predetermined domain is established. Thus, the other GUI may be used to enter GPS coordinates for the location. Or, the GUI may include a map of an area and the user may select a particular building or geographic area as indicated on the map to designate it as a secure area. Or, the GUI may include a building layout map of a particular building so that only a certain area, room, or floor of the building may be designated as a secure area and other areas may not be so designated.

Moving on from FIG. 10, it is to be understood consistent with present principles that in lieu of logging in to a certain service using a desktop version of a web browser as described above, in some examples a device operating consistent with present principles may permit an image or other data to be viewed at, stored at, and/or sent from the device while the device is connected to a service through a mobile application.

So, for example, a first mobile application may be executing at the first device to send or view an image, and may be a text message mobile application, email mobile application, social networking mobile application, cloud storage mobile application, etc. The image may be sent or viewed through that mobile application while the device is logged in to a service through a different mobile application that accesses the user's account through a domain name using the back end of the mobile application, even if a user need not actually navigate to a certain URL with the domain name through the mobile application and can merely login from a launch screen of the mobile application itself.

Additionally, as alluded to above note that present principles may apply to data besides still photographs, such as videos, audio files (e.g., an MP3 file), and even word processing documents or portable document format (PDF) documents and other types of files.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A method, comprising:
    determining that a first device is actively connected to a service associated with a predetermined domain name;
    using the first device to generate an image with a camera on the first device while the first device is at a predetermined location;
    responsive to the image being generated with the camera while the first device is at the predetermined location, encrypting the image with an encryption key that is associated with the predetermined location, the image being encrypted with the encryption key for decryption using an expiring decryption key, the encryption key being accessed by the first device through the service while the first device is actively connected to the service; and
    based on the first device being actively connected to the service associated with the predetermined domain name, permitting the image to be sent to a second device while the first device is actively connected to the service, wherein the image itself is not sent to the second device through the service based on the first device being actively connected to the service even though the first device being actively connected to the service is used for permitting the image to be sent to the second device.

2. The method of claim 1, wherein the image is a first image, and wherein the method comprises:
    based on the first device being actively connected to the service associated with the predetermined domain name, permitting a second image to be viewed at the first device.

3. The method of claim 1, comprising:
   determining whether the first device is actively connected, using biometric identification, to the service;
   based on the first device being actively connected, using biometric identification, to the service, permitting the image to be sent to the second device; and
   based on the first device not being actively connected to the service using biometric identification, declining to permit the image to be sent to the second device.

4. At least one computer readable storage medium (CRSM) that is not a transitory signal, the computer readable storage medium comprising instructions executable by at least one processor to:
   determine that a first device is currently logged in, using biometric identification, to a service through a first network;
   based on the first device being currently logged in, using biometric identification, to the service through the first network, permit data to be one or more of presented at the first device as received through a second network and sent to a second device through the second network, wherein the first network is different from the second network; and
   based on the first device being currently logged in to the service but not using biometric identification, decline to permit the data to be one or more of presented at the first device as received through the second network and sent to the second device through the second network.

5. The CRSM of claim 4, wherein the first network is associated with a predetermined domain name, and wherein the data comprises one or more of: a still photograph, an audio file, a video file.

6. The CRSM of claim 4, wherein the data comprises an image, and wherein the instructions are executable to:
   use the first device to generate the image with a camera on the first device while the first device is at a predetermined location;
   responsive to the image being generated with the camera while the first device is at the predetermined location, encrypt the image with an encryption key that is associated with the predetermined location, the image being encrypted with the encryption key for decryption using an expiring decryption key, the encryption key being accessed by the first device through the service while the first device is currently logged in to the service; and
   permit the image to be sent to the second device while the first device is currently logged in to the service, the image not being sent to the second device through the service.

7. An apparatus, comprising:
   at least one processor; and
   storage accessible to the at least one processor and comprising instructions executable by the at least one processor to:
   determine that a first device is actively connected to a service associated with a predetermined domain name;
   use the first device to generate an image with a camera on the first device while the first device is at a predetermined location;
   responsive to the image being generated with the camera while the first device is at the predetermined location, encrypt the image with an encryption key that is associated with the predetermined location, the image being encrypted with the encryption key for decryption using a decryption key, the encryption key being accessed by the first device through the service while the first device is actively connected to the service; and
   based on the first device being actively connected to the service associated with the predetermined domain name, permit the image to be sent to a second device while the first device is actively connected to the service, wherein the image itself is not sent to the second device through the service based on the first device being actively connected to the service even though the first device being actively connected to the service is used for permitting the image to be sent to the second device.

8. The apparatus of claim 7, wherein the instructions are executable to:
   determine whether the first device is actively connected, using biometric identification, to the service;
   based on the first device being actively connected, using biometric identification, to the service, permit the image to be sent to the second device; and
   based on the first device not being actively connected to the service using biometric identification, decline to permit the image to be sent to the second device.

9. The apparatus of claim 7, wherein the apparatus is the first device.

10. The apparatus of claim 7, wherein the apparatus comprises the first device.

11. The apparatus of claim 7, wherein the apparatus comprises the first and second devices.

12. The apparatus of claim 7, comprising the camera.

* * * * *